United States Patent [19]

Suchdev et al.

[11] Patent Number: 5,394,039
[45] Date of Patent: Feb. 28, 1995

[54] ELECTRIC MOTOR MOUNT HAVING VIBRATION DAMPING

[75] Inventors: Lakhbir S. Suchdev; Rory B. Bringhurst, both of Phoenix; Michael Baker, Chandler, all of Ariz.

[73] Assignee: Ryobi Outdoor Products Inc., Chandler, Ariz.

[21] Appl. No.: 5,641

[22] Filed: Jan. 19, 1993

[51] Int. Cl.6 .......................... H02K 5/24; B25D 17/24
[52] U.S. Cl. ...................................... 310/51; 173/162.2
[58] Field of Search ............................ 310/51, 91, 50; 173/162.1, 162.2

[56] References Cited

U.S. PATENT DOCUMENTS

| | | | |
|---|---|---|---|
| 3,831,278 | 8/1974 | Voglesonger | 30/276 |
| 3,886,716 | 6/1975 | Sellers | 56/17.4 |
| 4,136,446 | 1/1979 | Tripp | 30/276 |
| 4,140,446 | 2/1979 | Fernström et al. | 418/270 |
| 4,211,004 | 7/1980 | Woods | 30/276 |
| 4,268,233 | 5/1981 | Fernström et al. | 418/270 |
| 4,635,732 | 1/1987 | Gotsch et al. | 173/162.1 |
| 4,905,772 | 3/1990 | Honsa et al. | 173/162.1 |

Primary Examiner—R. Skudy
Assistant Examiner—Judson H. Jones
Attorney, Agent, or Firm—Brooks & Kushman

[57] ABSTRACT

A motor housing for a string trimmer having a vibration damper disposed between the housing member and the motor. The motor housing has transverse motor support ribs fixedly supporting the motor. A damper chamber is formed in the housing between and end face and an adjacent transverse motor support rib. Stiffner ribs disposed between the end face and the adjacent transverse motor support rib form radial seats on diametrically opposite sides of the motor. A resilient linear vibration damper member is compressively received in each of the damper chambers between the electric motor and the radial seats.

24 Claims, 2 Drawing Sheets

ELECTRIC MOTOR MOUNT HAVING VIBRATION DAMPING

TECHNICAL FIELD

The invention is related to the field of mounts for electric motors and in particular to a motor housing for a string trimmer having a motor vibration damper.

BACKGROUND ART

In devices using electric motors, such as string trimmers, the electric motor is supported inside a motor housing by a support structure. These support structures may take various forms as taught by the prior art. One type of support structure commonly used is a series of transverse support ribs which engage the sides of the electric motor and inhibit any transverse displacement of the electric motor relative to the housing. In many of these devices, the member driven by the electric motor is rotatively unbalanced and which upon rotation impart a vibration to the motor itself. The vibration of the motor produces a transverse force on the ends of the support ribs engaging the motor which, after a period of time, deforms the support ribs allowing the motor to vibrate independent of the motor housing. This latter condition results in a hammering of the ends of the support ribs by the motor further aggravating their deformation. This also increases the vibrational force transmitted to the motor housing. This deformation of the motor support ribs is accelerated when the motor housing is made from a structural plastic in which the support ribs are integrally molded into an external shell or housing.

In hand-held devices, such as a string trimmer, the increased vibration of the housing is transmitted to the user and produces an unacceptable sensation and, on occasion, produces a numbness of the user's limbs. This increased vibration also leads to catastrophic failure of the support ribs resulting in a significant shortening of the useful life of the device.

The invention is a vibration damper disposed between the electric motor and the motor housing which reduces the deformation of the support ribs, absorbs a significant portion of the vibrational energy imparted to the motor by the unbalanced driven device, reduces the amplitude of the vibration imparted to the motor housing and increases the operating life of the device.

SUMMARY OF THE INVENTION

The invention is a vibration damper for a small electric motor rotating an unbalanced driven member, and in particular, a vibration damper provided in the motor housing of a hand-held string trimmer. The object of the invention is to dampen the vibration produced by the driven head of a spring trimmer. The advantage of the vibration damper is that it significantly reduces the vibration of the motor housing which is transmitted to the user. Another advantage is that it reduces the forces acting on the internal ribs of the motor housing, reduces the deformation of these ribs and increases the life of the string trimmer.

A motor housing incorporating the vibration damper has at least two motor support ribs which rigidly support the electric motor therein. A pair of diametrically disposed damper chambers are provided at the end of the motor housing adjacent to the output end of the electric motor. The damper chambers are bounded between an end face member spaced a predetermined distance forward of the last motor support rib and the last motor support rib. A plurality of stiffner ribs are disposed between last motor support rid and the end face member which form a radial seat in each damper chamber. A resilient linear member is compressively disposed between the radial seats and the electric motor to absorb the vibrations imparted to the electric motor caused by the rotation of the unbalanced driven member.

Further objects and advantages of the vibration damper will become apparent from a reading of the detailed description of the invention with respect to the drawings.

DETAILED DESCRIPTION OF THE BEST MODE

Figure 1:
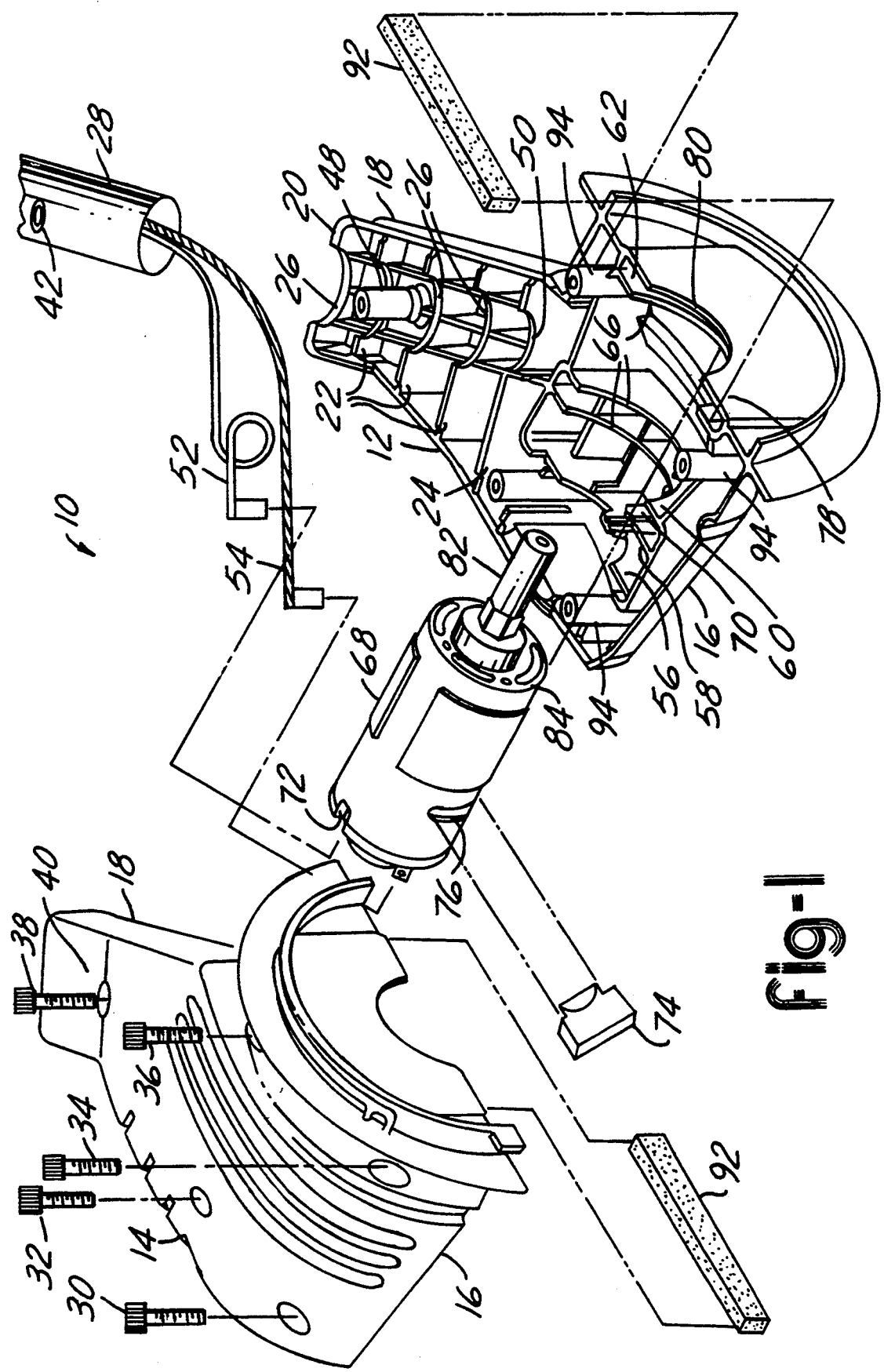
FIG. 1 is an exploded view of a string trimmer motor housing embodying a vibration damper.

The motor housing 10 of a typical string trimmer, as shown in FIG. 1, comprises two molded plastic housing members 12 and 14 which are substantially mirror images of each. Each of the housing members has a motor mounting portion 16 and a handle mounting portion 18. The handle mounting portion 18 has an end closure member 20, a plurality of transverse handle support ribs 22 and a stop rib 24. The internal edges of the end closure member 20 and the support ribs have contoured recesses 26 in which the handle of the string trimmer is received. The size and shape of the contoured recesses 26 are selected such that the handle is rigidly secured in the handle mounting portion 18 when the molded housing members 12 and 14 are secured to each other by bolts 30 through 38. Bolt 38 passes through a first aperture 40 provided through the handle portion 18 of the housing member 16 through a second aperture 42 provided through the handle 28 and is threadably received in an internally threaded mounting post 48, provided in the handle portion 18 of the housing member 12. The bolt 38 secures the handle portions 18 of the two housing members 12 and 14 to each other and prohibits the axial displacement of the handle 28 relative to the motor housing 10.

The stop rib 24 has a arcuate recess 50 which has a diameter less than the diameter of the handle 28. The aperture formed by the actuate recess when the two housing members 12 and 14 are secured to each other permits the electrical lead 52 and 54 to pass from inside the handle 28 into the interior of the motor portion 16. During the assembly of the motor housing 10, the stop rib 24 axially positions the handle portion so that the aperture 42 in the handle is aligned with the aperture 40 and the internally threaded post 48.

Each housing portion 16 has a transverse internal rib 56, a plurality of transverse motor support ribs 58 through 62, and an end face rib 64. Each of the support ribs 58 through 62 has an arcuate relief 66 which has a diameter substantially equal to the diameter of the electric motor 68. The electric motor 68 is received in the arcuate recesses 66 and is rigidly supported in the motor housing 10 by the motor support ribs 58–62. The internal end rib 56 of each of the housing members 12 and 14 has a radially disposed key 70 which is received in a mating slot 72 provided at the internal end of the electric motor 68. The keys 70 prevent the motor 68 from rotating relative to the motor housing 10.

A pair of transverse keys 74 engage mating slots 76 provided in the housing of the motor 68. The transverse keys 74 are slidably received in the space between motor support ribs 58 and 60 and prevent the axial displacement of the motor 68 relative to the motor housing 10.

The end face member 78 is disposed at the end of the motor mounting portion 16 opposite the internal end rib 56. Each end face member 78 has a semi-circular relief 80 which when mated with a corresponding semi-circular relief 80 of the housing member 14 forms a clearance aperture in the motor housing 10 for the shaft 82 of the electric motor 68. When the motor 68 is inserted in the motor support portion 16 of the housing members 12 and 14, the forward end 84 of the motor effectively closes the aperture formed by the semi-circular reliefs 80.

As shown in FIG. 1, the housing member 12 may have a plurality of thread posts 94 which threadably receive the bolts 30 through 36 to secure the housing member 14 to the housing member 12 with the electric motor 68 and the vibration damper members 92 therein.

Figure 2:
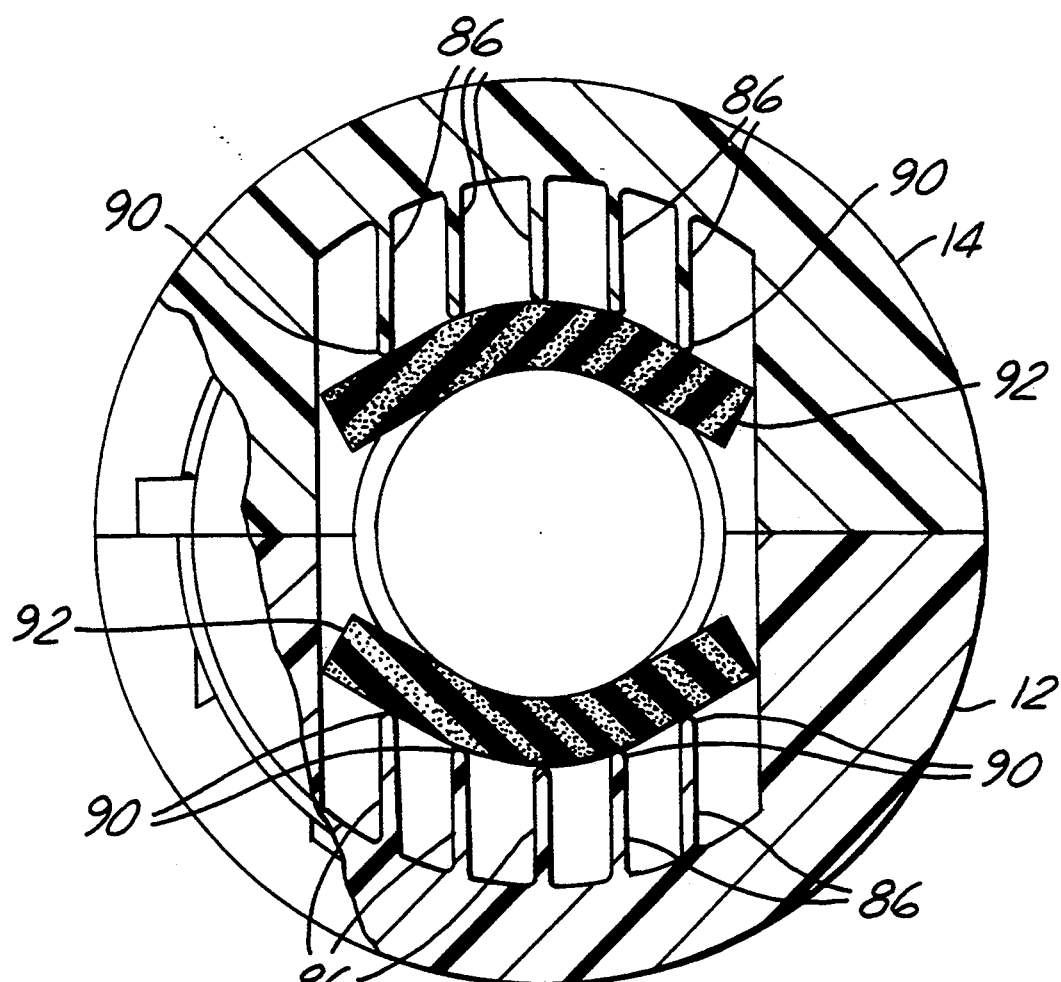
FIG. 2 is a cross-section of the motor housing showing the conical seat formed by the ends of the stiffner ribs.
Figure 3:
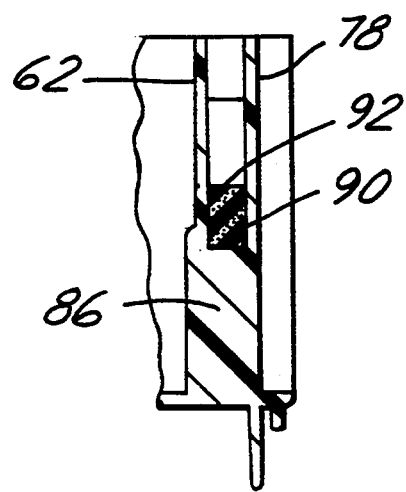
FIG. 3 is a cross-section showing the relationship of the stiffner ribs to the end face member and the adjacent motor support rib.

FIGS. 2 and 3 are partial cross-sections showing a series of parallel stiffner ribs 86 extending between the end face member 78 and the motor support rib 62. The internal ends 90 of the parallel stiffner ribs 86 form an arcuate seat for the resilient vibration damper 92. The vibration damper 92 is a resilient linear member having the general form of a rectangular parallelopiped in its relaxed or undistorted state as shown in FIG. 1 and is compressively deformed in the motor housing 10 to engage opposite side portions of the motor 86 as shown in FIG. 2. Alternatively, the vibration damper may have a circular cross-section or any other shape known in the art. Also, it is not required that the vibration damper have a linear shape, but vibration dampers having an arcuate shape are also contemplated as being within the scope of the invention.

The width of the vibration damper 92 is substantially equal to the axial spacing between the motor support rib 62 and the end face member 78 and its height is greater than the distance between the internal ends 90 of the parallel stiffner ribs 86 and the electric motor such that the vibration dampers 92 are under compression when housing members are secured to each other using bolts 30 through 36. In the assembled state, a string feeder head (not shown) is attached to the rotary output shaft 82 of the motor 68.

When first assembled, the motor support ribs 65 through 62 in each of the motor housing members 12 and 14 compressively engage the motor 68 and prohibit transverse movement of the motor 68 relative to the motor housing 10. As is known in the art, the string feeder head is rotatively unbalanced, due to the cutting string extending radially therefrom. The unbalanced string feeder head imparts a vibratory force to motor 68 through the rotary output shaft 82. This vibratory force is transmitted from the motor 68 to the motor housing through the motor support ribs 58 through 62. After a period of time, this vibrational force deforms the arcuate reliefs 66 on the motor support ribs 58 through 62 such that the motor is no longer rigidly supported in the motor housing 10. After this happens, the motor is free to vibrate relative to the housing and the amplitude of vibration of the motor increases resulting in an increase of the vibratory force imparted by the motor 68 on the motor support ribs 58 through 62. This further enlarges the arcuate reliefs of the motor support ribs and increasing the amplitude of the vibration of the motor housing 10 to the point where it becomes objectionable to the user.

The vibration dampers 92 engaging the sides of the motor adjacent to the end face members 78 resiliently absorb the vibrational force of the motor 68 significantly reducing the vibration of the motor housing 10 and the vibration transmitted to the user. The vibration dampers 92 also significantly reduce the deformation of the arcuate relief of the motor support ribs. The vibration dampers 92 not only results in a string trimmer in which the vibration transferred to the user is significantly reduced but also results in a string trimmer having an extended useful life.

Having described and illustrated a motor housing for a string trimmer having a vibration damper for reducing the vibrations transferred to the user and which also extends the operating life of the string trimmer, it is recognized that those skilled in the art may conceive improved or alternate motor housing structures having vibration dampers that are within the spirit of the invention as described herein and set forth in the appended claims.

What is claimed is:

1. A mount for an electric motor comprising:
   an external housing;
   at least two motor support ribs integral with said housing for fixedly supporting the electric motor;
   a damper chamber provided in said external housing circumscribing one end of the electric motor;
   a resilient vibration damper disposed in said damper chamber resiliently engaging the electric motor adjacent to said one end to damp the vibration thereof.

2. The mount of claim 1 wherein said damper chamber comprises:
   an end face member attached to said external housing adjacent to said one end of said electric motor;
   an intermediate member attached to said external housing and spaced from said end face member in a direction towards the end of said electric motor opposite said one end; and
   a vibration damper support connected between said end face member and intermediate member defining a seat for said vibration damper.

3. The mount of claim 2 wherein said vibration damper support comprises a plurality of stiffner ribs disposed between said end face member and said intermediate member, each stiffner rib having an internal end, said internal ends of said plurality of stiffner ribs defining said seat for said vibration damper.

4. The mount of claim 3 wherein said plurality of stiffner ribs are disposed parallel to each other.

5. The mount of claim 4 wherein said damper chamber comprises at least two damper chambers symmetrically spaced about said electric motor.

6. The mount of claim 5 wherein said damper chamber comprises two damper chambers disposed on opposite sides of said motor.

7. The mount of claim 2 wherein said seat formed by said damper support is a circular arc having a radius greater than the radius of said electric motor.

8. The mount of claim 6 wherein said ends of said stiffner ribs form an arcuate seat spaced a predetermined radial distance from said electric motor.

9. The mount of claim 2 wherein said intermediate member is one of said at least two motor support ribs.

10. The mount of claim 1 wherein said resilient vibration damper comprises a linear resilient member disposed in said damper chamber and resiliently engaging said electric motor.

11. The mount of claim 6 wherein said vibration damper comprises two linear resilient members, each of said two linear resilient members disposed in a respective one of said two damper chambers.

12. The mount of claim 8 wherein said vibration damper comprises two linear resilient members having a rectangular cross-section, each of said two linear resilient members being received in a respective one of said damper chambers, each of said linear resilient members being bent by said arcuate seat to partially circumscribe said electric motor on opposite sides thereof.

13. The mount of claim 1 wherein said external housing comprises two complementary housing halves, each housing half having respective half portions of said at least two motor mount ribs, respective half portions of said damper chamber and means for securing said two complementary housing halves to each other to fixedly support said electric motor and said resilient vibration damper therein.

14. A motor housing for the electric motor of a line trimmer comprising:
  a housing member enclosing said electric motor;
  at least two motor support ribs integral with said housing member for fixedly supporting the electric motor therein;
  a damper chamber provided in said housing member adjacent to one end of said electric motor; and
  a resilient vibration damper disposed in said damper chamber resiliently engaging the electric motor to damp the vibration of said motor relative to said housing.

15. The motor housing of claim 14 wherein the electric motor has a rotary output at one end, said damper chamber is disposed adjacent to said one end of the electric motor having said rotary output shaft.

16. The motor housing of claim 15 wherein said damper chamber comprises:
  an end face member partially enclosing the motor housing adjacent to said one end of the electric motor, said end face member having a centrally disposed clearance aperture for said rotary output shaft;
  an intermediate member attached to said housing and spaced from said end face member in a direction towards the end of said motor opposite said one end; and
  a plurality of stiffner ribs disposed between said end face member and said intermediate member, the ends of said plurality of stiffner ribs forming a radial seat for said vibration damper.

17. The motor housing of claim 16 wherein said damper chamber comprises at least two damper chambers equally spaced about the electric motor.

18. The motor housing of claim 17 wherein said at least two damper chambers comprises two damper chambers disposed on diametrically opposite sides of said motor.

19. The motor housing of claim 16 wherein said intermediate member is one of said motor support ribs.

20. The motor housing of claim 16 wherein said vibration damper is a resilient linear member.

21. The motor housing of claim 18 wherein said vibration damper comprises two resilient linear members, each resilient linear member being disposed in a respective one of said two damper chambers.

22. The motor housing of claim 17 wherein said two resilient linear members have a rectangular cross-section.

23. The motor housing of claim 14 wherein said housing member further includes means for attaching a handle thereto.

24. A motor housing for an electric motor having a rotary output shaft for rotating the head of a string trimmer, comprising:
  a pair of complementary housing halves which together form a housing member enclosing the electric motor;
  at least two motor support ribs disposed in each of said complementary housing halves for fixedly supporting the electric motor in said housing member;
  an end face portion provided on each of said complementary housing halves, said end face portions cooperating to partially close said housing, each of said end face portions having a centrally disposed relief permitting the output shaft of the electric motor to pass therethrough;
  two damper chambers, one provided in each of said complementary housing halves on opposite sides of said electric motor;
  a plurality of stiffner ribs provided in each of said two damper chambers forming a radial seat; and
  two resilient linear vibration dampers, each of said two linear vibration dampers being disposed in a respective one of said two damper chambers, said two resilient linear vibration dampers being resiliently compressed between the motor and said radial seats.

* * * * *

UNITED STATES PATENT AND TRADEMARK OFFICE
CERTIFICATE OF CORRECTION

PATENT NO. : 5,394,039

DATED : February 28, 1995

INVENTOR(S) : SUCHDEV et al.

It is certified that error appears in the above-identified patent and that said Letters Patent is hereby corrected as shown below:

Column 2, Line 3:
(Application Page 3, Line 10)

Delete "rid" and insert --rib--.

Column 2, Line 54:
(Application Page 4, Line 28)

Delete "actuate" and insert --acruate--.

Signed and Sealed this

Thirtieth Day of May, 1995

Attest:

BRUCE LEHMAN

*Attesting Officer*          *Commissioner of Patents and Trademarks*